United States Patent
Alperin et al.

(10) Patent No.: US 8,842,818 B2
(45) Date of Patent: Sep. 23, 2014

(54) IP TELEPHONY ARCHITECTURE INCLUDING INFORMATION STORAGE AND RETRIEVAL SYSTEM TO TRACK FLUENCY

(75) Inventors: Jonathan Alperin, Mendham, NJ (US); David L. Chavez, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 1813 days.

(21) Appl. No.: 11/538,730

(22) Filed: Oct. 4, 2006

(65) Prior Publication Data

US 2008/0003964 A1 Jan. 3, 2008

Related U.S. Application Data

(60) Provisional application No. 60/817,971, filed on Jun. 30, 2006.

(51) Int. Cl.
| | | |
|---|---|---|
| *H04M 3/00* | (2006.01) | |
| *H04M 5/00* | (2006.01) | |
| *H04L 12/58* | (2006.01) | |
| *H04M 3/523* | (2006.01) | |
| *H04M 3/51* | (2006.01) | |
| *H04M 3/42* | (2006.01) | |
| *H04L 29/06* | (2006.01) | |
| *H04L 29/08* | (2006.01) | |

(52) U.S. Cl.
CPC .......... *H04M 3/5233* (2013.01); *H04M 3/5125* (2013.01); *H04M 3/42365* (2013.01); *H04L 63/00* (2013.01); *H04M 3/42008* (2013.01); *H04L 51/32* (2013.01); *H04L 67/24* (2013.01); *H04L 63/30* (2013.01)
USPC ................................ 379/265.06; 379/265.12

(58) Field of Classification Search
USPC ..................... 707/600, 705; 370/352; 705/10; 709/228, 230; 725/135; 715/200; 379/265.12, 265.01, 265.02, 265.06, 379/265.09
See application file for complete search history.

(56) References Cited

U.S. PATENT DOCUMENTS

| | | |
|---|---|---|
| 4,817,130 A | 3/1989 | Frimmel, Jr. |
| 4,941,168 A | 7/1990 | Kelly, Jr. |
| 5,206,903 A | 4/1993 | Kohler et al. |

(Continued)

FOREIGN PATENT DOCUMENTS

| | | |
|---|---|---|
| EP | 0 886 416 | 12/1998 |
| EP | 1261179 | 11/2002 |

(Continued)

OTHER PUBLICATIONS

Official Action for Canada Patent Application No. 2,583,069, dated Dec. 10, 2010.

(Continued)

*Primary Examiner* — Nafiz E Hoque
(74) *Attorney, Agent, or Firm* — Sheridan Ross P.C.

(57) ABSTRACT

In one embodiment, an enterprise network is provided that includes subscriber communication devices 120, 148, and 150, an archival server 128 to store representations of communications between subscribers and/or between subscribers and nonsubscribers, and a module 160, 168, and/or 174 that analyzes a communication by a subscriber for selected content and, when the selected content is present in the communication, determines a weighted value associated with the communication and/or subscriber. The value reflects timing information associated with the communication. The archival server subsequently uses the weighted value to locate the recorded communication and/or identify the subscriber as being fluent in the selected content.

25 Claims, 7 Drawing Sheets

(56) References Cited

U.S. PATENT DOCUMENTS

| | | | |
|---|---|---|---|
| 5,430,792 A | 7/1995 | Jesurum et al. | |
| 5,434,908 A | 7/1995 | Klein | |
| 5,511,112 A | 4/1996 | Szlam | |
| 5,555,376 A | 9/1996 | Theimer et al. | |
| 5,619,254 A | 4/1997 | McNelley | |
| 5,619,648 A | 4/1997 | Canale et al. | |
| 5,712,902 A | 1/1998 | Florence et al. | |
| 5,742,763 A | 4/1998 | Jones | |
| 5,802,510 A | 9/1998 | Jones | |
| 5,819,084 A | 10/1998 | Shapiro et al. | |
| 5,826,039 A | 10/1998 | Jones | |
| 5,828,747 A | 10/1998 | Fisher et al. | |
| 5,864,874 A | 1/1999 | Shapiro | |
| 5,905,793 A | 5/1999 | Flockhart et al. | |
| 5,982,873 A | 11/1999 | Flockhart et al. | |
| 6,031,896 A | 2/2000 | Gardell et al. | |
| 6,038,296 A | 3/2000 | Brunson et al. | |
| 6,046,762 A | 4/2000 | Sonesh et al. | |
| 6,088,441 A | 7/2000 | Flockhart et al. | |
| 6,094,681 A | 7/2000 | Shaffer et al. | |
| 6,128,304 A | 10/2000 | Gardell et al. | |
| 6,130,937 A | 10/2000 | Fotta | |
| 6,163,607 A | 12/2000 | Bogart et al. | |
| 6,173,053 B1 | 1/2001 | Bogart et al. | |
| 6,185,603 B1 | 2/2001 | Henderson et al. | |
| 6,192,122 B1 | 2/2001 | Flockhart et al. | |
| 6,226,360 B1 | 5/2001 | Goldberg et al. | |
| 6,298,062 B1 | 10/2001 | Gardell et al. | |
| 6,307,931 B1 | 10/2001 | Vaudreuil | |
| 6,311,231 B1 | 10/2001 | Bateman et al. | |
| 6,317,593 B1 | 11/2001 | Vossler | |
| 6,330,243 B1 | 12/2001 | Strandberg | |
| 6,330,317 B1 | 12/2001 | Garfinkel | |
| 6,332,081 B1 | 12/2001 | Do | |
| 6,360,222 B1 | 3/2002 | Quinn | |
| 6,411,682 B1 | 6/2002 | Fuller et al. | |
| 6,430,271 B1 | 8/2002 | DeJesus et al. | |
| 6,430,602 B1 | 8/2002 | Kay et al. | |
| 6,449,260 B1 | 9/2002 | Sassin et al. | |
| 6,463,471 B1 | 10/2002 | Dreke et al. | |
| 6,477,105 B2 | 11/2002 | Wu | |
| 6,477,374 B1 | 11/2002 | Shaffer et al. | |
| 6,480,484 B2 | 11/2002 | Morton | |
| 6,535,600 B1 | 3/2003 | Fisher et al. | |
| 6,546,097 B1 | 4/2003 | Peltz | |
| 6,549,612 B2 | 4/2003 | Gifford et al. | |
| 6,561,805 B2 | 5/2003 | Kumar | |
| 6,614,783 B1 | 9/2003 | Sonesh et al. | |
| 6,668,167 B2 | 12/2003 | McDowell et al. | |
| 6,675,168 B2 | 1/2004 | Shapiro et al. | |
| 6,700,967 B2 | 3/2004 | Kleinoder et al. | |
| 6,738,462 B1 | 5/2004 | Brunson | |
| 6,741,586 B1 | 5/2004 | Schuster et al. | |
| 6,788,773 B1 | 9/2004 | Fotta | |
| 6,789,120 B1 | 9/2004 | Lee et al. | |
| 6,839,735 B2 | 1/2005 | Wong et al. | |
| 6,878,924 B2 | 4/2005 | Baron | |
| 6,879,677 B2 | 4/2005 | Trandal et al. | |
| 6,879,828 B2 | 4/2005 | Virtanen et al. | |
| 6,882,641 B1* | 4/2005 | Gallick et al. | 370/356 |
| 6,891,933 B2 | 5/2005 | Kumamoto | |
| 6,925,166 B1 | 8/2005 | Chan | |
| 6,968,052 B2 | 11/2005 | Wullert, II | |
| 6,968,179 B1 | 11/2005 | De Vries | |
| 6,999,731 B2 | 2/2006 | Cronin | |
| 7,023,980 B2 | 4/2006 | Lenard | |
| 7,027,987 B1 | 4/2006 | Franz et al. | |
| 7,054,939 B2 | 5/2006 | Koch et al. | |
| 7,068,762 B2 | 6/2006 | Skladman et al. | |
| 7,092,370 B2 | 8/2006 | Jiang et al. | |
| 7,158,630 B2 | 1/2007 | Fotta et al. | |
| 7,162,473 B2* | 1/2007 | Dumais et al. | 1/1 |
| 7,587,664 B2* | 9/2009 | Newbold | 715/200 |
| 2002/0019829 A1 | 2/2002 | Shapiro | |
| 2002/0021307 A1 | 2/2002 | Glenn et al. | |
| 2002/0035605 A1 | 3/2002 | McDowell et al. | |
| 2002/0052225 A1 | 5/2002 | Davis et al. | |
| 2002/0055350 A1 | 5/2002 | Gupte et al. | |
| 2002/0055912 A1 | 5/2002 | Buck | |
| 2002/0055975 A1 | 5/2002 | Petroyikh | |
| 2002/0065894 A1 | 5/2002 | Dalai et al. | |
| 2002/0076010 A1 | 6/2002 | Sahel | |
| 2002/0083127 A1 | 6/2002 | Agrawal | |
| 2002/0085701 A1 | 7/2002 | Parsons et al. | |
| 2002/0087630 A1 | 7/2002 | Wu | |
| 2002/0098831 A1 | 7/2002 | Castell et al. | |
| 2002/0116336 A1 | 8/2002 | Diacakis et al. | |
| 2002/0116461 A1 | 8/2002 | Diacakis et al. | |
| 2002/0120687 A1 | 8/2002 | Diacakis et al. | |
| 2002/0126701 A1 | 9/2002 | Requena | |
| 2003/0014491 A1 | 1/2003 | Hovitz et al. | |
| 2003/0018720 A1 | 1/2003 | Chang et al. | |
| 2003/0028525 A1* | 2/2003 | Santos et al. | 707/3 |
| 2003/0028621 A1 | 2/2003 | Furlong et al. | |
| 2003/0073440 A1 | 4/2003 | Mukhegee et al. | |
| 2003/0154293 A1* | 8/2003 | Zmolek | 709/228 |
| 2004/0041836 A1 | 3/2004 | Zaner et al. | |
| 2004/0093290 A1 | 5/2004 | Doss et al. | |
| 2004/0120498 A1 | 6/2004 | Sylvain | |
| 2004/0141594 A1 | 7/2004 | Brunson | |
| 2004/0148275 A1 | 7/2004 | Achlioptas | |
| 2004/0210844 A1 | 10/2004 | Pettinati et al. | |
| 2004/0249650 A1* | 12/2004 | Freedman et al. | 705/1 |
| 2005/0031107 A1 | 2/2005 | Fotta | |
| 2005/0047394 A1* | 3/2005 | Hodson et al. | 370/352 |
| 2005/0108775 A1* | 5/2005 | Bachar et al. | 725/135 |
| 2005/0132079 A1* | 6/2005 | Iglesia et al. | 709/230 |
| 2005/0159970 A1 | 7/2005 | Buyukkokten et al. | |
| 2005/0169446 A1 | 8/2005 | Randall et al. | |
| 2005/0177614 A1 | 8/2005 | Bourne | |
| 2005/0262114 A1* | 11/2005 | Nevin et al. | 707/100 |
| 2006/0074863 A1* | 4/2006 | Kishore et al. | 707/3 |
| 2006/0085417 A1* | 4/2006 | John et al. | 707/6 |
| 2007/0064908 A1* | 3/2007 | Levy et al. | 379/211.03 |
| 2007/0162569 A1 | 7/2007 | Robinson et al. | |
| 2007/0282661 A1 | 12/2007 | Franco | |
| 2008/0021998 A1* | 1/2008 | Wentink | 709/226 |
| 2008/0086551 A1 | 4/2008 | Moy | |

FOREIGN PATENT DOCUMENTS

| | | |
|---|---|---|
| JP | 9-200813 | 7/1997 |
| JP | 2002-176449 | 6/2002 |
| JP | 2003-8655 | 1/2003 |
| JP | 2003-122834 | 4/2003 |
| JP | 2004-192521 | 7/2004 |
| JP | 2004-343220 | 12/2004 |
| WO | WO 00/39964 | 7/2000 |
| WO | WO 00/69140 | 11/2000 |
| WO | WO 01/55915 | 8/2001 |
| WO | WO 01/69387 | 9/2001 |
| WO | WO 02/30105 | 4/2002 |
| WO | WO 03/025776 | 3/2003 |
| WO | WO 03/069364 A2 | 8/2003 |

OTHER PUBLICATIONS

Uhlig et al. "Designing BGP-based outbound traffic engineering techniques for stub ASes", date unknown, pp. 1-17.

Oiu et al., "On Selfish Routing in Internet-Like Environments", SIGCOMM'03, Aug. 25-29, Karlsruhe, Germany, pp. 151-162.

Akella et al. "A Measurement-Based Analysis of Multihoming", SIGCOMM'03, Aug. 25-29, Karlsruhe, Germany, pp. 353-364.

Nakao et al. "A Routing Underlay for Overlay Networks", SIGCOMM'03, Aug. 25-29, Karlsruhe, Germany, pp. 11-18.

Goldenberg et al. "Optimizing cost and Performance for Multihoming", SIGCOMM'04, Aug. 30-Sep. 3, 2004, Portland, Oregon, USA, 14 pages.

Akella et al. "A Comparison of Overlay Routing and Multihoming Route Control", SIGCOMM'04, Aug. 30-Sep. 3, 2004, Portland, Oregon, USA, 14 pages.

Labovitz et al. "Delayed Internet Routing Convergence", SIGCOMM'00, Stockholm, Sweden, Copyright 2000, pp. 175-187.

(56) References Cited

OTHER PUBLICATIONS

Lloyd "On the performance characteristics of BGP routing decisions", Route Science, ISMA 2001, slides 1-19.
NCH Swift Sound "VRS Recording System—Professional Multi-Channel Audio and Telephone recorder Software", NCH Swift Sound, available at http://www.nch.com.au/vrs/index.html, printed Jul. 29, 2008, pp. 1-3.
Forman "Contact Networks Makes Making Connections Easier", Mass High Tech Mar. 28, 2005, pp. 1-2.
Liben-Nowell et al., "Geographic routing in social networks", PNAS, Aug. 16, 2005, vol. 102, No. 33, pp. 11623-11628.
Ni "Selfish Routing in Social Networks", Senior Design Projects, University of Pennsylvania, 2004-2005, pp. 1-14.
European Search Report for European Patent Application No. 07251987.9, mailed May 5, 2008.
Day et al., "Instant Messaging / Presence Protocol Requirements", Network Working Group, Feb. 2000, 25 pages.
"Common Presence & Instant Messaging: Message Format," Network Working Group (Jan. 9, 2003) http://www.ietf.internet-drafts/draft-ietf-impp-cpim-msgfmt-06.txt, 31 pages.
Berners-Lee et al.; "Uniform Resource Identifiers (URI); Generic Syntax," Network Working Group, Request for Comments 2396 (Aug. 1998), 38 pages.
Bill Michael, The Politics of Naming www.cConvergence.com (Jul. 2001) pp. 31-35.
CC News: Call Center Technology, "FaceTime gives voice, vision to instant messaging", http://www.ccnews.com/may2000/depts/cct/cctstory2.htm, 2 pages; Copyright 2000, 1999.
Chavez et al., "Interactive Applications of Personal Situation-Aware Assistants", Computers and Graphics, Pergamon Press Ltd., Oxford, GB, vol. 23, No. 6, Dec. 1999.
CommWeb.com "Enterprise Customer Interfaces: Application Messaging Via Instant Messaging" (Dec. 9, 2002), available at http://www.commweb.com/article/COM20021209S0001/2, 3 pages.
CosmoCall Universe™, "The Carrier-Grade, All-IP Contact Center Platform for Next Generation Network-Based Services" (2002) 3 pages.
CosmoCall Universe™, "The Next Generation IP Contact Center Platform", available at http://www.cosmocom.com/ProductInfo/Product.htm, 18 pages, 1997-2003.
Crocker et al. "Common Presence and Instant Messaging (CPIM)," Network Working Group (Aug. 14, 2002), http://www.ietf.internet-drafts/draft-ietf-impp-cpim-03.txt, 33 pages.
Dawson et al.; "Veard MIME Directory Profile," Network Working Group (Sep. 1998), available at http://www.ietf.org/rfc/rfc2426.txt?number=2428, 40 pages.
Day et al. "A Model for Presence and Instant Messaging," Network Working Group (Feb. 2000), available at http://www.ietf.org/rfc/rfc2277.txt?number=2778, 16 pages.
e-Vantage Solutions, "Customer Service Window", available at http://www.evgl.com/dsw.html, 2 pages, 2003.
FaceTime Communications Press Release, "Amica Insurance Selects FaceTime Communications to Provide Instant Messaging-Based Customer Service in Enterprise" (Jun. 25, 2001).
FaceTime Communications website, "Customer Services", available at http://www.facetime.com/custsvcs.shtm, 4 pages, 2003.
FaceTime Communications website, "Overview", available at http://www.facetime.com/solutions.shtm, 4 pages, 2003.
FaceTime Communications website, "Presence Management", available at http://www.facetime.com/presence.shtm, 3 pages, 2003.
Fielding et al.; "Hypertext Transfer Protocol—HTTP/1.1," Network Working Group, Request for Comments 2068 (Jan. 1997), 152 pages.
G. Klyne et al., "Instant Messaging using APEX", Network Working Group, Jun. 1, 2001, 19 pages.
G. Klyne; "A Syntax for Describing Media Feature Sets," Network Working Group (Mar. 1999), available at http://www.ietf.org/rfc/rfc2533.txt?number=2533, 35 pages.
G. Klyne; "Protocol-independent Content Negotiation Framework," Network Working Group (Sep. 1999), available at http://www.ietf.org/rfc/rfc2703.txt?number=2703, 19 pages.

Grigonis, Computer Technology Encyclopedia (2000) pp. 342-345, 389-392.
Gulbrandsen et al.; "A DNS RR for Specifying the Location of Services (DNS SRV)," Network Working Group (Feb. 2000), http://www.ietf.org/rfc/rfc2782.txt?number=2782, 12 pages.
Holtman et al; "HTTP Remote Variant Selection Algorithm—RVSA/1.0," Network Working Group (Mar. 1998), available at http://www.ietf.org/rfc/rfc2296.txt?number=2296, 13 pages.
Holtman et al.; "Transparent Content Negotiation in HTTP," Network Working Group (Mar. 1998), available at http://www.ietf.org/rfc/rfc2295.txt?number=2295, 55 pages.
J. Rosenberg et al., "SIP extensions for Instant Messaging", Internet Engineering Task Force, Jul. 18, 2001, 22 pages.
Live2Support, "Features", Available at http://well.archive.org/web/20040206215142/www.live2support.com/features_live_chat.php>, undated, 4 pages.
"MIT Project Oxygen Publications", 2 pages, undated.
MIT Project Oxygen, "Oxygen: Pervasive, Human-Centered Computing" MIT Laboratory for Computer Science, MIT Artificial Intelligence Laboratory (May 2002).
Ovisoft Technologies, "Ovisoft Messenger—Call Center Solutions", available at http://www.ofisoft.com/solutioncallcenter.htm, 1 page, 2003.
Richard Grigonis, Computer Telephony Encyclopedia (2000) pp. 367-375.
Richard Grigonis,. Computer Telephony Encyclopedia (2000) pp. 413-430.
Richard Shockey, "ENUM: Phone Numbers Meet the Net", www.cConveroence.corn (Jul. 2001) pp. 21-30.
Rose et al.. "The APEX Presence Service," Network Working Group (Jan. 14, 2002), available at http://www.ieff.org/internet-drafs/draft-ielf-apex-presence-06.txt, 31 pages.
Schulzrinne, H., et al., "The Session Initiation Protocol: Internet-Centric Signaling", IEEE Communications Magazine (Oct. 2000), vol. 38, No. 10, pp. 134-141.
Stephanie Losi, "Instant Messaging for Call Centers Leaves 'Em Smiling" www.CRMDaily.com (Jun. 4, 2001), available at http://www.newsfactor.com/perl/story/10246.html, 3 pages.
Sugano et al, "Common Presence and Instant Messaging (CPIM) Presence Information Data Format," Network Working Group (Dec. 2002), 26 pages.
The MIT Oxygen Project, Cambridge, MA, Apr. 25-26, 2000Trudy Walsh, "Instant messaging boosts service at Texas call center" GCN (Nov. 2001), 2 pages.
Venus Valley, "Live chat for your website", Available at http://www.pppindia.com/vvchat/shots.htm>, Venus Valley Live Support, 2003, 2 pages.
WiredRed News Release, "WiredRed to Provide Secure Instant Messaging for Eight New Call Center Customers", http://www.wiredred.com/news_release_callctr.html, 2 pages.
XML-NS Tim Bray et al., "Namespaces in XML", W3C recommendation: xml-names, Jan. 14, 1999, 12 pages.
"Phone Mail Override for Incoming Calls", IBM Technical Disclosure Bulletin, vol. 37, No. 11, Nov. 1994.
"Video Conferencing, Web Conferencing & Online Meeting Software," 6 pages, 2005, WiredRed Software, available at http://www.wiredred.com.
The Sonic Spot "Audio File Formats", 5 pages, 2006, Sonic Spot, available at http://www.sonicspot.com/guide/fileformatlist.html.
Red Box Recorders "Products," 2 pages, undated,available at http://www.redboxrecorders.com/newproducts.shtml.
PBXpress "PBXpress-Call Recording VoIP PBX," 5 pages,Jan. 5, 2006, PBXpress Communications, Inc., available at http://www.pbxpress.com.
Steven Cherry, "Total Recall," IEEE Spectrum, Nov. 2005, pp. 24-30, IEEE.
Curt Franklin, "How Internet Search Engines Work," 6 pages, 2000, How Stuff Works, available at http://computer.howstuffworks.com/search-engine1.htm.
Encounter Collaborative "Audio and Web Conferencing . . . made easy!", 2 pages, 2005 Encounter Collaborative, available at http://www.encounter.net/home/.

(56) References Cited

OTHER PUBLICATIONS

Interactive Intelligence, Products & Solutions, Multimedia recording and scoring "Interaction Recorder"; 3 pages; 2006.

NCH Swift Sound "VRS Recording System—Professional Audio Recording Software," 5 pages, NCH Swift Sound, available at http://www.nch.com.au/vrs/.

Activa Solutions "VoIP Recording Solutions," 2 pages, undated, Activa Solutions, available at http://www.activa.co.uk/products_voip_recording.php.

Zoom International "IP Recording Solution, Enterprise and Hosted Deployment, Live Monitoring, Screen Capture and Quality Management"; 2 pages; 2006I.

Andtek "And Phone Recorder IP Telephony Call Recording," 2 pages, 2006 AndtekGmbH, available at http://recorder.andtek.com/product-recorder.html?language=english.

Rays Lab "Advanced Call Recorder—your phone calls recorder," 2 pages, 2006, Rayslab, Inc., available at http://www.rayslab.com/call_recorder/.

Spescom DataVoice "DataVoice IP Recorder for Cisco AVVID," 4 pages, 2004, Spescom, available at http://www.datavoice.spescom.com/content.asp?menuID=82.

U.S. Appl. No. 11/864,189, Bengtson et al. (Sep. 28, 2007).

Examiner's Office Letter for Japanese Patent Application No. 2007-171404, mailed Mar. 15, 2010.

European Search Report for European Patent Application No. 07251987.9, mailed Oct. 26, 2007.

English Translation of Official Action for Japanese Patent Applicatin No. 2007-171404, dated Jun. 29, 2011 2 pages.

\* cited by examiner

Tag Cloud Example

Afghanistan Tag Al Qaida Annika Sorenstam Apparently Baghdad Bush Administration Canadian Cancer Drug Cancers Cars Chicago White Reds Closer Clouds Death Death Penalty Decades Democracy Pistons Drugs Egypt European Union Florida Marlins Food Program Console Games Germany Glazer I Guantanamo Bay Homer Hostage Indiana Pacers Indonesia Insurgents Ipod Don't Israel Japan Losing Streak Lost Man Manchester United Marines Match Members Microsoft Microsoft Corp Military Bases Mobile Phone Mobile Phones England New Study New York New York Yankees Newsweek Magazine For Food Oil For Food Program Get Parliament Pentagon President Bush Prime Minister It Pyongyang Refused Saddam Hussein Scientists Senate Panel Shaquille O Neal Siliconvalley

FIG.8

IP TELEPHONY ARCHITECTURE INCLUDING INFORMATION STORAGE AND RETRIEVAL SYSTEM TO TRACK FLUENCY

CROSS REFERENCE TO RELATED APPLICATION

The present application claims the benefits of U.S. Provisional Application Ser. No. 60/817,971, filed Jun. 30, 2006, of the same title, to Chavez, et al., which is incorporated herein by this reference.

FIELD OF THE INVENTION

The invention relates generally to communication systems and particularly to switch-based enterprise telecommunication systems.

BACKGROUND OF THE INVENTION

The convergence of the mobile telephone network, the static telephone network, and the IP network provides a myriad of communication options for users. If one seeks to contact another individual, he or she may do so by electronic mail or e-mail, instant messaging, wired or wireless telephone, personal computer, pager, personal digital assistant or PDA, and Unified Messaging or UM systems, to name but a few. With so many options, it is difficult, if not impossible, to determine which option at a given point in time will provide the caller with the highest likelihood of contacting the desired individual or contactee. Trial and error and guesswork are the typical techniques used to contact the contactee, which more often than not leads to a waste of time and frustration on the part of the caller.

Various attempts have been made to provide a presence and availability system that can track temporally a person's presence and availability and thereby provide a contactor with the highest likelihood of contacting the person. This is typically effected by collecting information from communication devices associated with the person. Such systems can further permit the person to define their availability to be contacted generally and/or to defined groups of contactors and how that contactor or group of contactors may contact them. This can be effected by allowing the person to configure the contactor's access control settings. As will be appreciated, contactors can view the information regarding the availability of contactees and use that information to determine whether or not and how to initiate or continue communications.

Recently, the Session Initiation Protocol or SIP (which is a simple signaling/application layer protocol for data network multimedia conferencing and telephony) has been developed to facilitate media-independent signaling and the implementation of presence and availability systems. Although other protocols may be equally supportive of presence concepts, SIP provides an illustrative basis for the present invention. In SIP, end systems and proxy servers can provide services such as call forwarding, contactee and contactor number delivery (where numbers can be any naming scheme such as a conventional URL format), personal mobility (the ability to reach a contactee under a single, location-independent address even when the contactee changes terminals), terminal-type negotiation and selection (e.g., a contactor can be given a choice on how to reach the contactee), terminal capability negotiation, caller and callee authentication, blind and supervised call transfer, and invitations to multiparty conferences.

To provide these varied services, SIP uses a relatively simple message system. Contacts begin via an "INVITE" message (with the contactor's codec preferences) and an "OK" message (with the contactee's codec preferences). Various software entities may participate, namely registrars which maintain a map of the addresses of a given user at the current time, proxies which perform call routing, some session management, user authentication, redirect functions, and routing to media gateways, redirect servers which perform a subset of forwarding functions, and SIP location servers which maintain user profiles and provide subscriber registration. "Registration" is a mechanism whereby a user's communication device registers with the network each time he or she comes online or needs to charge existing registration and individual profiles are maintained that specify information for routing contacts based on a number of different criteria.

Even with the emergence of presence aware telecommunication systems, there is an increasing need to use telecommunication systems to realize presence awareness in other dimensions. By way of example, many enterprise organizations, particularly extremely large organizations, are unaware of all of the areas and levels of expertise and knowledge of large percentages, if not all, of their employees.

For example, in the context of a large financial company, such as a brokerage firm, an employee agent may receive a call from a critical client asking for an answer, within five minutes, whether he or she should invest in company XYZ. If the client fails to invest within five minutes, the stock price could rise, costing the client more money and increasing his or her risk while decreasing his or her return. If the agent knows nothing, or very little, about company XYZ, he is limited to performing a quick web search and/or asking other employees for relevant information about company XYZ (which is at best a hit-or-miss proposition). For the most part, these resources are the same resources available to the client. Whatever advice is given to the client will likely not be the best advice that could be provided by the available fluent resources of the financial company. The reason for the failure to provide the best advice is that the financial company has little awareness, as embodied by a central, employee accessible database, of the current fluency of its employees on topics of interest to its clients.

SUMMARY OF THE INVENTION

These and other needs are addressed by the various embodiments and configurations of the present invention. The present invention is directed generally to an architecture and method for tracking and determining fluency of selected groups of people. As used herein, "fluency" refers to a level or degree of knowledge, skill, proficiency, familiarity, or expertise in a given subject, with a given subject matter, in performing a given task or activity, and/or with a selected topic.

In a first embodiment of the present invention, a method for identifying selected resources and/or content is provided that includes the steps of:

(a) analyzing, for selected content, a communication by a communicant/subscriber;

(b) when the selected content is present in the communication, determining a weighted value associated with the communication and/or communicant/subscriber, the value reflecting timing information associated with the communication; and (c) subsequently using the weighted value to locate the communication and/or identify the communicant/subscriber as being fluent in the selected content.

In one configuration, the weighted value is used to weigh tags associated with a stored representation of the communication. In other words, recency of the communication is used as one of the weighting factors in ranking the degrees of relevancy of different stored communication representations to a given Boolean search query.

In another configuration, the weighted value is used to determine a level of fluency of the communicant in a topic related to or associated with the selected content.

In another embodiment, a method of operating an enterprise network is provided that includes the steps of:

(a) recording communications (which can be in the form of voice, video or data such as email, instant messaging and/or chat sessions) of the subscribers with other persons, the voice communications being recorded in temporal proximity to the time the voice communications occurred;

(b) tagging the stored representations of the communications for later search and retrieval of the communications, the tags being descriptive of a content of the communication and context of the communication;

(c) when a search request is received, using the tags to locate communications complying with the search request; and (d) when a communication complies with a search request, audibly and/or visually providing the communication to the requestor.

The invention can provide a new Internet Protocol telephony architecture where a desktop client determines topics its user is fluent in and gives them various weights including a weight based on recentness. It also can export this information to a central directory so real time access to up-to-date topic fluent users is possible. All communications streams (including voice, video, and data streams such as e-mail, instant messaging and/or chat sessions) are preferably stored, archived, context tagged, and available for future retrieval. A rich desktop client can then provide the user access to the topic directory, returning weighted users fluent in the topic, their presence states, and the ability to automatically contact them individually, serially, or concurrently. The attempted sessions are assigned a priority by the requestor. When a recipient is contacted, it includes information on the requestor, the reason why the recipient is being contacted (e.g., topic), and the priority of the contact.

The present invention can provide a number of advantages depending on the particular configuration. The present invention can provide the ability to auto-generate and update in real time a directory of users and their fluencies in topics including a weighting. It can provide the ability for the user to query for a list of people fluent in a topic including a recency relevancy component. It can provide the ability for a user to receive such a response to a query indicating the presence state of all people returned and providing a rich mechanism to contact them, whether individually, serially, or concurrently. It can provide the recipient with rich information on the context of the pending session, topic, originator, priority, whether it is a conference or not. It can provide a voice recording as a basic service required of every call. It can provide secure access to the voice archive using relevance scoring popular in information management systems. It can take advantage of IP connections for a low cost connection, DVR technology for low cost storage, relevance engines for quick and correct information access, secure access by separating tags from data, and requiring an access agent authenticate all retrievals against rules it enforces.

These and other advantages will be apparent from the disclosure of the invention(s) contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The above-described embodiments and configurations are neither complete nor exhaustive. As will be appreciated, other embodiments of the invention are possible utilizing, alone or in combination, one or more of the features set forth above or described in detail below.

BRIEF DESCRIPTION OF THE DRAWINGS

FIG. 8 depicts a set of tags according to an embodiment of the present invention.

DETAILED DESCRIPTION

Overview of System Architecture

Figure 1:
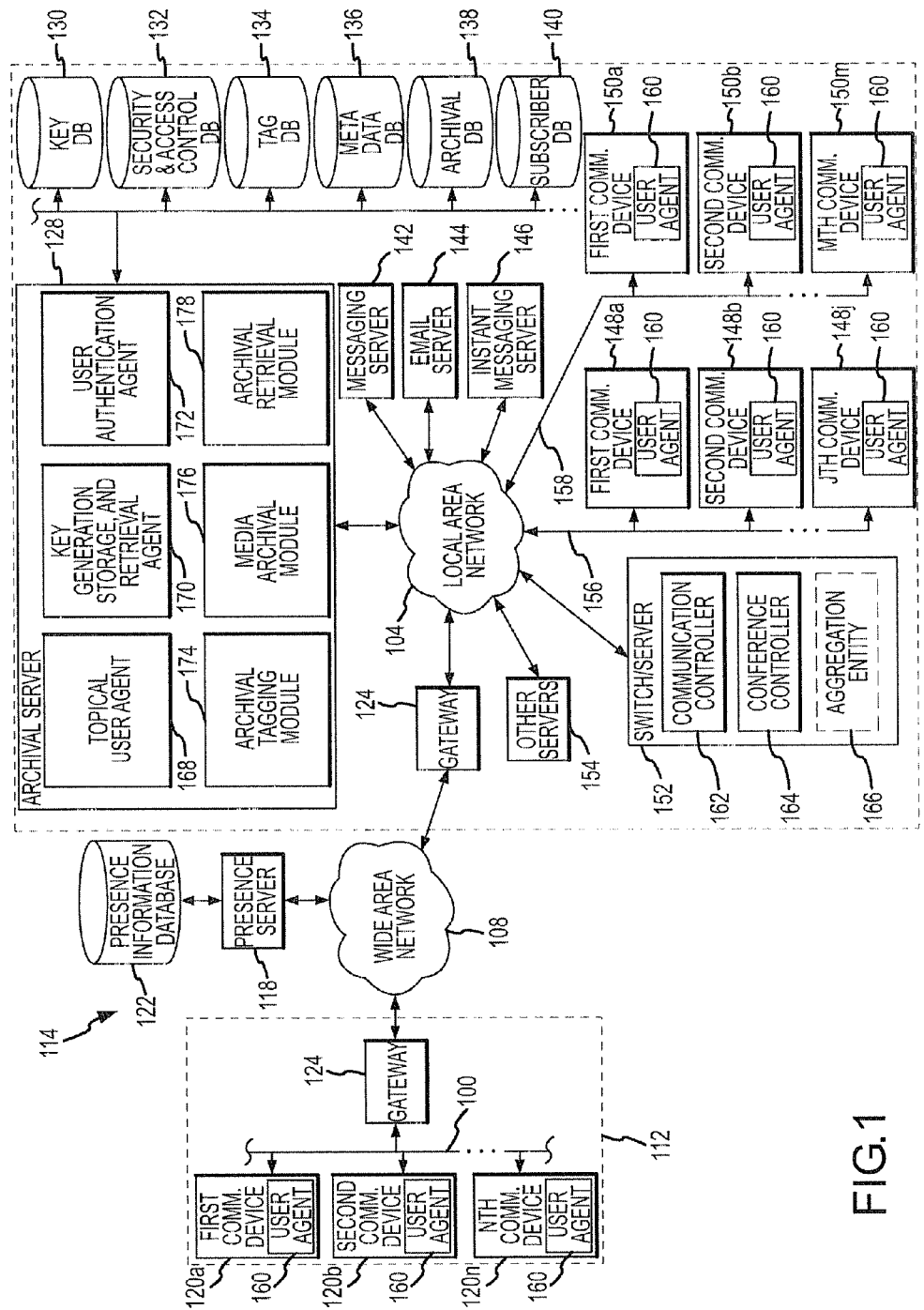
FIG. 1 is a block diagram of a communications architecture according to an embodiment of the present invention.

According to a first embodiment of the present invention, first and second enterprise Local Area Networks (LANs) 100 and 104 and presence service 114 are interconnected by one or more Wide Area private and/or public Network(s) (WANs) 108. The first and second LANs 100 and 104 correspond, respectively to first and second enterprise premises 112 and 116.

The first enterprise premises 112 includes first, second, ... nth communication devices 120a-n and a gateway 124 interconnected by the LAN 100. The first enterprise premises 112 may include other components depending on the application, such as a switch and/or server (not shown) to control, route, and configure incoming and outgoing contacts.

The second enterprise premises 116 includes a gateway 124, an archival server 128 maintaining and accessing a key database 130, a security and access control database 132, a tag database 134, a meta data database 136, an archival database 138, and a subscriber database 140, a messaging server 142, an email server 144, an instant messaging server 146, first, second, . . . jth communication devices 148a-j, first, second, . . . mth communication devices 150a-m, a switch/server 152, and other servers 154. The two enterprise networks may constitute two different enterprises (engaging in business to business relations for example) or be two sites of the same enterprise.

The presence service 114, which may or may not be operated by the enterprise, includes a presence server 118 and associated presence information database 122. The presence server 118 and presence information database 122 collectively track the presence and/or availability of subscribers and provide, to requesting communication devices, current presence information respecting selected enterprise subscribers.

As used herein, a "subscriber" refers to a person who is serviced by, registered or subscribed with, or otherwise affiliated with an enterprise network, and "presence information" to any information associated with a network node and/or endpoint device, such as a communication device, that is in turn associated with a person or identity. Examples of presence information include registration information, information regarding the accessibility of the endpoint device, the endpoint's telephone number or address, the recency of use of the endpoint device by the person, recency of authentication by the person to a network component, the geographic location of the endpoint device, the type of media, format language, session and communications capabilities of the currently available communications devices, the preferences of the person (e.g., contact mode preferences or profiles such as the communication device to be contacted for specific types of contacts or under specified factual scenarios, contact time preferences, impermissible contact types and/or subjects such as subjects about which the person does not wish to be contacted, and permissible contact type and/or subjects such as subjects about which the person does wish to be contacted. Presence information can be user configurable, i.e., the user can configure the number and type of communications and message devices with which they can be accessed and to define different profiles that define the communications and messaging options presented to incoming contactors in specified factual situations. By identifying predefined facts, the system can retrieve and follow the appropriate profile.

The WAN(s) can be any distributed network, whether packet-switched or circuit-switched. In one configuration, the WANs 108 include a circuit-switched network, such as the Public Switch Telephone Network or PSTN, and a packet-switched network, such as the Internet. In another configuration, WAN 108 includes only one or more packet-switched networks, such as the Internet.

The gateways 124 can be any suitable device for controlling ingress to and egress from the corresponding LAN. The gateways are positioned logically between the other components in the corresponding enterprise premises and the WAN 108 to process communications passing between the appropriate switch/server and the second network. The gateway 124 typically includes an electronic repeater functionality that intercepts and steers electrical signals from the WAN to the corresponding LAN and vice versa and provides code and protocol conversion. Additionally, the gateway can perform various security functions, such as network address translation, and set up and use secure tunnels to provide virtual private network capabilities. In some protocols, the gateway bridges conferences to other networks, communications protocols, and multimedia formats. Examples of suitable gateways include Avaya Inc.'s, G700™, G650™, G350™, MCC/SCC™ media gateways and Acme Packet's Net-Net 4000 Session Border Controller.

The first, second, . . . nth communication devices 120a-n and first, second, . . . jth communication devices 148a-j are preferably packet-switched stations or communication devices, such as IP hardphones (e.g., Avaya Inc.'s 4600 Series IP Phones™), IP softphones (e.g., Avaya Inc.'s IP Softphone™), Personal Digital Assistants or PDAs, Personal Computers or PCs, laptops, packet-based H.320 video phones and conferencing units, packet-based voice messaging and response units, peer-to-peer based communication devices, and packet-based traditional computer telephony adjuncts. Examples of suitable devices are the 4610™, 4621SW™, and 9620™ IP telephones of Avaya, Inc.

The first, second, . . . nth communication devices 150a-m are preferably circuit-switched and/or TDM devices. As will be appreciated, the stations 136 and 140 are normally plugged into a Tip ring interface that causes electronic signals from the station to be placed onto a TDM bus (not shown). Each of the stations corresponds to one of a set of internal (Direct-Inward-Dial) extensions on its controlling switch/server. The controlling switch/server can direct incoming contacts to and receive outgoing contacts from these extensions in a conventional manner. The stations 136 and 140 can include, for example, wired and wireless telephones, PDAs, H.320 video phones and conferencing units, voice messaging and response units, and traditional computer telephony adjuncts. Examples of suitable devices are the 30010™, 2410™, and 2420™ Digital Telephones of Avaya, Inc. Although not shown, the first enterprise premises 112 can also include circuit-switched or TDM communication devices, depending on the application.

The various sets of communication devices are internal to the enterprise. As will be appreciated, the enterprise can further be in communication with external communication devices of subscribers and nonsubscribers. An "external" communication device is not controlled by an enterprise switch/server (e.g., does not have an extension serviced by the switch/server) while an "internal" device is controlled by an enterprise switch/server.

The communication devices in the first and second enterprise premises 112 and 116 can natively support streaming IP media to two or more consumers of the stream. The devices can be locally controlled in the device (e.g., point-to-point) or by the gateway 124 or remotely controlled by the communication controller 162 in the switch/server 152. When the communication devices are locally controlled, the local communication controller should support receiving instructions from other communication controllers specifying that the media stream should be sent to a specific address for archival. If no other communication controller is involved, the local communication controller should support sending the media stream to an archival address.

The archival server 128 maintains and accesses the various associated databases. This functionality and the contents of the various databases are discussed in more detail below.

The messaging server 142, email server 144, and instant messaging server 146 are application servers providing specific services to enterprise subscribers. As will be appreciated, the messaging server 142 maintains voicemail data structures for each subscriber, permitting the subscriber to receive voice messages from contactors; the email server 144 provides electronic mail functionality to subscribers; and the instant messaging server 146 provides instant messaging functionality to subscribers.

The switch/server 152 directs communications, such as incoming Voice Over IP or VoIP and telephone calls, in the enterprise network. The terms "switch", "server", and "switch and/or server" as used herein should be understood to include a PBX, an ACD, an enterprise switch, an enterprise server, or other type of telecommunications system switch or server, as well as other types of processor-based communication control devices such as media servers, computers, adjuncts, etc. The switch/(media) server can be any architecture for directing contacts to one or more communication devices. Illustratively, the switch/server 152 of FIG. 1 can be the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Definity™ Private-Branch Exchange (PBX)-based ACD system; MultiVantage™ PBX, CRM Central 2000 Server™, Communication Manager™, S8300™ media server, SIP Enabled Services™, and/or Avaya Interaction Center™. The switch/server 152 typically is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. Exemplary control programs include a communication controller 162 to direct, control, and configure incoming and outgoing contacts, a conference controller 164 to set up and configure multi-party conference calls, and an aggregation entity 166 to provide to the archival server 128 plural media streams from multiple endpoints involved in a common session. The switch/server comprises a network interface card to provide services to the associated internal enterprise communication devices.

The switch/server 152 is commonly connected via a plurality of trunks (not shown) (which may be for example Primary Rate Interface, Basic Rate Interface, Internet Protocol, H.323 and SIP trunks) to the WAN 108 and via link(s) 156 and 158, respectively, to the first, second, . . . . Jth stations 148a-j and first, second, . . . . Mth stations 150a-m, respectively.

Other servers 154 can include a variety of servers, depending on the application. For example, other servers 154 can include proxy servers that perform name resolution under the Session Initiation Protocol or SIP or the H.323 protocol, a domain name server that acts as a Domain Naming System or DNS resolver, a TFTP server 334 that effects file transfers, such as executable images and configuration information, to routers, switches, communication devices, and other components, a fax server, ENUM server for resolving address resolution, and mobility server handling network handover, and multi-network domain handling.

It should be noted that the invention does not require any particular type of information transport medium or protocol between switch/server and stations and/or between the first and second switches/servers, i.e., the invention may be implemented with any desired type of transport medium as well as combinations of different types of transport media.

Although the preferred embodiment is discussed with reference to a client-server architecture, it is to be understood that the principles of the present invention apply to other network architectures. For example, the invention applies to peer-to-peer networks, such as those envisioned by the Session Initiation Protocol. In the client-server model or paradigm, network services and the programs used by end users to access the services are described. The client side provides a user with an interface for requesting services from the network, and the server side is responsible for accepting user requests for services and providing the services transparent to the user. By contrast in the peer-to-peer model or paradigm, each networked host runs both the client and server parts of an application program. Moreover, the invention does not require a specific Internet Protocol Telephony (IPT) protocol and could be implemented, for example, using QSIG, H.323, and combinations thereof. Additionally, the invention does not require the presence of packet- or circuit-switched networks.

The User Agent

Each communication device 120, 128 and 150 includes a corresponding user agent 160. The agent 160 tracks the activities performed by the subscriber using the corresponding communication device, determines what topics the subscriber is fluent in, and provides the subscriber with desired information. The information can include a list of other subscribers that are fluent in a selected topic and the respective presence information for each of the listed subscribers. The tracked activities can be any selected activity-related, such as a communication with one or more other parties and preparation of a document. For example, the user agent 160 can inspect email sent, instant messages sent, live voice communications sent, voice messages sent, documents reviewed, created, and/or edited, Web browsing sessions, and any other form of communication where content of the communication can be electronically discerned. The inspection is performed using selected keywords or collections of keywords, each of which is associated with an area or topic of fluency. The keywords may be selected by the user and/or enterprise. The agent 160 then weighs the identified occurrences of keywords and updates a fluency level of the corresponding subscriber in the topics associated with the identified keywords. The updated fluency level(s) are provided, in real time or near real time, to the archival server 128 for storage in the subscriber database 140, as discussed in detail below. The weights applied to the keyword occurrences can be based on a number of factors, including frequency of occurrence of the keyword, broadness of the inspected body of information (e.g., how many different people the person has corresponded with regarding the keyword or set of keywords), recentness of the occurrences (e.g., of the communication in which they occur), whether the keyword was originated by the subscriber or another, the context of the activity-related information (e.g., a communication with a customer vs. another employee), type of communication medium used (e.g., whether a communication is voice or text), the level of order relationship (e.g., use first, second, . . . nth order relationships to describe the degree of relevance of keywords), the type of activity generating the information (e.g., whether the activity is a communication or word processing session), requester preferences (e.g., persons with whom the requester is willing or unwilling to communicate, etc.), and located person's preferences (e.g., type of calls person is willing to take, level of urgency required for the person to take the call, contactors with whom the person is willing or unwilling to communicate, etc.). This list is not exhaustive of the type of information that may be used to determine the user's fluency in a topic.

Figure 5:
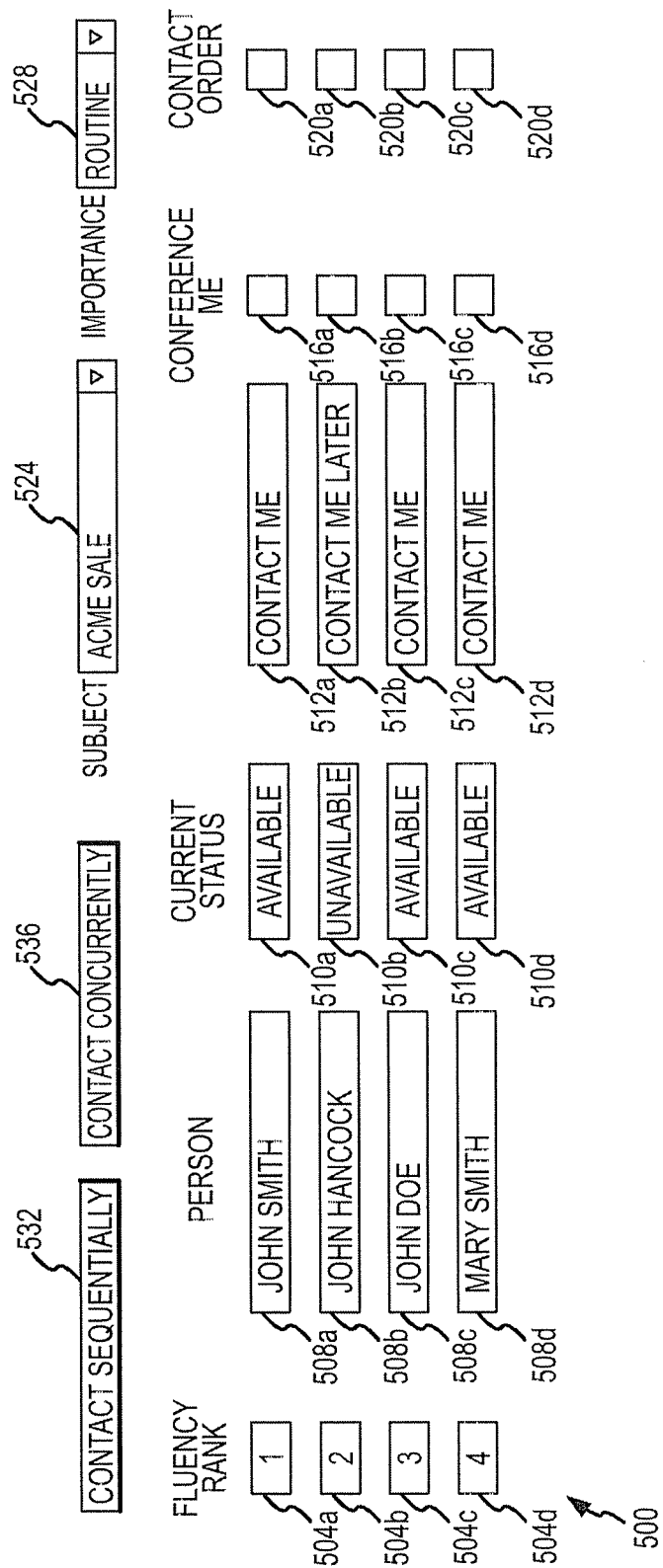
FIG. 5 is a screen shot of a subscriber display by the user agent according to an embodiment of the present invention.

The utility of the user agent 160 is illustrated by FIG. 5, which illustrates a display provided by the agent to the corresponding subscriber in response to a subscriber query for a list of employees fluent in one or more selected topics. The display 500 includes a number of fields. The fluency rank fields 504a-d rank each of the identified persons based upon his or her fluency ranking relative to the others (or alternatively fluency level or score) in the selected topic(s), name fields 508a-d provide an identifier (e.g., name as shown in FIG. 5), current status fields 510a-d provide the current presence and availability (e.g., most current presence information) for the corresponding person ("available" meaning that the person is currently available and "unavailable" that the person is current unavailable or uncontactable), contact icons 512a-d permit the subscriber, by clicking on the icon to contact the corresponding person (the "contact me" icon initiates a present contact while the "contact me later" icon initiates a contact at a later, scheduled time), conference me fields 516a-d indicate whether the subscriber would like to set up a conference call with a number of the persons selected by the subscriber (by checking the box), contact order fields 520a-d indicate an order in which the persons are to be contacted, a subject field 524 indicate the subject of the contact (e.g., shown as being related to "ACME sale", and which normally is derived from the search query behind the fluency listing), and importance field 528 indicating an importance or urgency of the contact. All the persons returned by the query can be selected by clicking on the select all button above the column of the field in question.

The subscriber may contact the selected persons one-at-a-time by clicking on the corresponding contact me icon 512, sequentially by clicking on the contact sequentially icon 532, or concurrently by clicking on the contact concurrently icon 536.

Regarding the first option, when the subscriber clicks on one of the icons 512a and c-d (which correspond respectively to John Smith, John Doe, and Mary Smith) a drop down menu appears giving the subscriber the option of contacting the person now or at a scheduled time later. If later, the subscriber enters into the drop down menu the desired time for the contact and the user agent 160 contacts the presence information database 122 to determine whether the time is acceptable. If so, the user agent 160 generates automatically a corresponding entry on the subscriber's and selected person's electronic calendars. If not, the user agent 160 provides the subscriber with acceptable contact times and asks the subscriber to select a different, conforming time. After an acceptable time is selected, the user agent 160 generates appropriate entries in the subscriber's and selected person's electronic calendars. When a contact me later icon 512b (which corresponds to John Hancock) appears and is selected by the subscriber, a drop down menu appears asking the subscriber to list a time for the contact. From that point, the further steps are the same as those discussed above.

Regarding the second option, the subscriber can sequentially attempt to contact plural members of the list by filling an order value in each of the contact order fields 520a-d for the members to be contacted. Failing to enter a value means that that person is not to be contacted. Thus, if the subscriber enters a value of "1" in field 520a, "2" in field 520d, and "4" in field 520c and then clicks on the contact sequentially icon 532, the agent 160 initiates contacts to John Smith first, Mary Smith second, and John Doe third. The contacts can be configured so that the first person to answer stops the contact sequence. Thus, if John Smith fails to answer but Mary Smith does, John Doe would not be contacted. Alternatively, the contacts can be configured so that the first person is contacted, and, if unsuccessful or, if successful, after the contact terminates, the second person is contacted, and so on.

Regarding the third and final option, the subscriber can concurrently attempt to contact plural members of the list by clicking on the fields 516a-d of the selected ones of the members of the list to be conferenced in and clicking on the icon 536. The agent 160 will then initiate a conference call by attempting to contact each of the selected persons. The conference call may be completed only with those selected members that answer or be terminated if less than the selected members answer.

The importance field 528 when selected has a drop down menu that lists various categories of urgency. For example, the drop down menu can include, in increasing order of urgency/importance, the options of "routine", "informational", "important", "critical", and "emergency".

This field 528 can be used to filter contacts to the listed persons. The presence information can include subscriber permissions to receive incoming contacts from selected persons at selected times and not to receive incoming contacts from others. These permissions can further be conditioned upon the level of urgency of the incoming contact. For example, a subscriber can predetermine that an incoming contact from a first party is refused if it is routine or informational but accepted if it is important or critical. Additionally, the level of urgency can be used to broaden the number of different types of communication devices/modalities by which the subscriber may be contacted. For example, the subscriber can predetermine that during the hours of X and Y incoming contacts from the first party must be directed to a particular communication device (e.g., desk phone and not mobile phone) or by a particular communication modality (e.g., voice call and not instant messaging). When the incoming contact from the first party is important or critical, the subscriber can predetermine that an incoming voice contact from the first party is accepted on the mobile phone and that the contact may also be done by instant messaging.

Although not shown in FIG. 5, the subscriber may further select the mode of the contact. For example, a further set of contact modality fields may be included in the display 500. When the subscriber selects a particular field corresponding to a particular listed person, a drop down menu appears listing various modes of communication (e.g., email, instant messaging, live voice circuit-switched, live voice packet-switched (or VoIP), etc.). The subscriber may then select one of the options, which populates the field. This may be done for each person to be used for sequential contacts. In other words, the subscriber may choose to contact each person by the same or different communication modalities.

When a listed person receives an incoming from another subscriber, the user agent 160 of the person's communication device provides, to the person, visually and/or audibly, an identity of the contactor subscriber, the reason that the person is being contacted (e.g., the subject field 524 contents), and the priority of the contact (e.g., the content of the importance field 528). The user agent for the recipient may take programmatic steps based on the priority, topic, or identity of the contactor subscriber. The programmatic steps include, for example, redirecting automatically the contact to the messaging server 142 or to one or more selected communication devices (including and/or different from the contacted communication device), using a special ring pattern or tone to announce the incoming call, superseding user preferences in the presence information received from the presence server 118, creating a pop-up window indicating the requested session from the originator and types of responses to be returned, and automatically answering the call based on priority and/or user preferences.

The user can create such user preferences simply by refusing to take a call by clicking on a "deny call" icon. The user agent 160 will automatically create a user preference that this type of call having this level of priority or lower and/or from this person will not be accepted in the future. Alternatively, this information could be used as a negative weighting factor.

The user agent 160 can be implemented in a variety of ways. Ways include as a thick-client software application, thin-client browser-based application, or other Web service-oriented application including voice-portal driven applications. It could be an embedded ability in an IP Hardphone or a pushed application to such a communication device such as a servlet or applet. It is envisioned that each of the subscriber-accessible application access methods will interact with Web server-based application(s) of the archival server components. The Web server-based applications are assumed to be accessible via standard HTTP protocols from any number of remote applications, with Common Gateway Interface (CGI) scripts necessary to read/write meta-data and archive files into the various repositories (or databases).

The Archival Server

The archival server 128 includes a number of computational components. These components include the topical user agent 168, key generation, storage, and retrieval agent 170, user authentication agent 172, archival tagging module 174, media archival module 172, and archival retrieval module 178.

The topical user agent 168 administers and accesses fluency levels and other data structures in the subscriber database 140. The subscriber database 140 includes, for each subscriber, a set of data structures that may include one or more of user name, user title, user home address, user communication device identifiers, user personal financial information, subscriber selected keywords, and subscriber fluency level(s) and associated topical areas. Each subscriber can have a number of fluency levels for a number of different topics; stated another way, each subscriber has a separate fluency level for each topic. The topical user agent 168 interacts with the user agents 160 in each communication device to receive updated fluency levels for each subscriber and update the subscriber's corresponding data structures accordingly and retrieve lists of persons and their presence information in response to queries received from user agents for selected topics.

The key generation, storage, and retrieval agent 170 generates keys for storing selected information in encrypted form. The keys are normally pointers to the stored content and are stored in the key database 130 and are organized to form indices to the stored archives. The keys are preferably unique. Although the keys are shown as being generated by the archival server 128, they could also be generated by the communication controller 162.

The user authentication agent 172, using subscriber profiles in the security and access control database 132, authenticates subscribers and, if successfully authenticated, determines what stored information (e.g., tags, meta-data, and archives) the subscriber is authorized to have access to. Authorization can be done by any suitable technique, including username, personal identification number, digital certificate, symmetric keys, asymmetric keys, and the like.

The media archival module 176 stores activity-related or archival information or data in the archival database 138. Such information or data includes all or selected portions of communications, and all or selected portions of documents. In one implementation, voice streams (and video streams) are stored, archived, tagged, and available for future retrieval. The module 176 receives media streams (preferably in encrypted form or ciphertext) and, using mass storage technology commonly employed in media such as DVRs, store the media stream. The media stream is preferably only indexed in the archival database 138 using the keys in the key database 130. The media is stored in encrypted form and has no information about context.

The archives can be stored in the archival database 138 in any number of formats, including MPEG/MP3, Microsoft Corporation's Windows™ media file, Apple's format for the IPOD™, audio and/or video file formats, and any other means for compressing media for digital storage or communication. The archival database 138 can alternatively be a flat file/directory structure with an index scheme (e.g., an index file or directory structure based on subscriber identifier (e.g., electronic address), timestamp, or unique identifier specified at the time of recording by the subscriber or another entity).

The archival tagging module 174 receives data tags and the unique archival key and creates search and relevance tags for the archived information. As used herein, tags are a type of meta-data that is descriptive of the archived information. As will be appreciated, "meta-data" is data that describes data objects. Tags typically are a code or set of characters inserted into a file or data structure indicating how the corresponding stored information is to be interpreted. The tags are normally in the form of eXtensible MarkUp Language (XML) or some other markup language. The tagging module 174 allows for configuration of user permissions to the databases or to specific subsets of archives and associated meta-data, allows users to retrieve and view specific meta-data elements that are non-modifiable, such as timestamp, recording length, etc.; allows users to enter a specific set of comma-delimited tags that become part of the meta-data associated with a particular archive index entry, allows users to retrieve, view and update specific data elements that are modifiable (e.g., the tags previously entered), and maintains an index of tags, also referred to as a tag cloud (discussed below), that represents the unique subset of all tags specified by a user or group of users against any number of archive files.

Data tags include meta-data descriptive of an activity, such as related to party (e.g., identities (name and/or electronic address) of parties to the communication, etc.), time (e.g., a timestamp (e.g., time and/or date) associated with a communication, a duration of the communication, etc.), form of recording of the activity (e.g., format of the recording, identifier associated with the recording (e.g., a unique identifier provided by the subscriber), etc.), and activity context (e.g., a reason for the communication, topics discussed (e.g., the keywords identified by the user agent 160), activities of each party prior and/or subsequent to and/or during the conversation (e.g., as determined by the user agent 160 by monitoring the computational operations of its corresponding communication device), and threading (whether the recorded activity was related to a previous activity)). The data tags may be obtained from other computational components, from the text of the communication, and/or from the subscriber(s). When received from the subscriber, the tags are a type of meta-tag.

Search and relevance tags are generated from the meta-data. The archival tagging module 174 normally includes an engine that refines and filters the data tags to produce the search and relevance tags. Factors used in search and relevance tag generation include a selected set of enterprise tags (e.g., tags selected by enterprise management), type of communication, context of communication, timestamp of communication, the level of order relationship (e.g., use first, second, . . . nth order relationships to describe the degree of relevance of tags), frequency of topic, breadth of communication on the topic, and recency of topical communication. Enterprise tags are tags mandated by enterprise management to provide coherence to the search engine. For example, data tags are mapped to the enterprise tags to avoid multiple tags referring to the same topic. This enhances topical search accuracy as the search terms for a given topic are standard. The system will automatically build more enterprise tags for itself as users enter topics in their queries for information not already embodied by an enterprise tag. In this case, the system will create a new enterprise tag based on the topic of the query, build n-th order relationships between the topics if multiple topics were entered, and create quickly scannable indexes for the topic(s) for future update and scanning. In one configuration, the user agent 160 provides, from a topical search window, to the subscriber a list of search and relevance tags from which the subscriber may select one or more search terms to be used. Search and relevance tags are stored in the tag database 134 while other meta-data, such as data tags, are stored in a meta-data database 136.

Tags can be any keyword or set of keywords, and data tags can be captured as written text or as spoken words translated to written text using an analog-to-digital converter and Speech-To-Text (STT) conversion. Additionally, some data tags (e.g., such as timestamp and participant identifiers) may be automatically captured as tags. As noted, the subscriber can be presented with a list of pre-existing or pre-determined (e.g., enterprise) tags and may select one or more from the existing list. The list of pre-existing or predetermined tags is a type of "tag cloud" of the type shown in FIG. 8. In FIG. 8, the subscriber has highlighted a number of tags, including "Tag", "Clouds", "I", "Don't", "Get", "President Bush", and "It", in connection with a communication that has been archived. For subscriber selected or inputted data tags, the subscriber needs to have access to either a device capable of capturing voice (e.g., a microphone), a keyboard, or a mouse or other pointing device, linked to an interface capable of capturing his or her data tag selection(s). The interface, for example, can be a speech recording/recognition engine, a Web browser, and other software application. The data tags are then transported to the archival server substantially simultaneous with the media.

In one configuration, the subscriber would access an HTML web-page provided by the archival tagging module 174 via the HyperText Transfer Protocol (HTTP) to the subscriber via a locally executed HTML browser. The displayed page would provide capabilities to display meta-data and enable the user to enter values for the meta-data elements as noted above.

Alternatively, the application that is responsible for interacting with the subscriber during the conversation itself (e.g., to start/control/stop recording and digitizing) could prompt the subscriber via the subscriber's communication link to speak a set of data tags and run the spoken data tags through a speech recognition engine, passing the resulting translated data tags to the meta-data database 136 along with other meta-data values. This would require incorporating the prompt-upon-call-recording-termination activities into the call recording application and integrating a speech-to-text function into one of two places. Either the call recording application parses and translates the data tags, passing them as additional items of meta-data to the archival tagging module 174 or passes a digitized set of spoken data tags to the tagging module 174 and allows the tagging module 174 to process that stream of audio into keywords and translate them to text, storing them as part of the associated meta-data.

The archival retrieval module 178 receives search queries from subscribers for stored information, which may be archives, meta-data, search and relevance tags, or fluent persons in a selected topic, performs the search in the corresponding database, and returns the located information to the requesting communication device for presentation to the subscriber. In other words, the module 178 presents users with a list of meta-data fields upon which the index can be searched, presents users with the tag cloud (e.g., the collection of all possible unique tags for which that user has permissions), allows the user to specify meta-data values or select one or more tags from the user's tag cloud and retrieve from the index a list of all archives whose meta-data or tag elements match those specified by the user, allows the user to identify one or more specific archives that he or she wishes to retrieve from a repository, and retrieves the specified archives for transmission/playback to the user. For example, the module 178 can receive a search query and, in response, generate, based on the relevance of the tags associated with archived media, a list of potential archived media satisfying the query in question. The retrieved archived media could be played back as a telephony call or displayed as a file sent to the subscriber, based on preferences and permissions which are enforced on the archival retrieval module 178. The search mechanism can be Web-based, voice-based, text-based, or by some other means.

In a simple configuration, it is assumed that there will be one party in the conversation that will control the start-stop of the recording. Depending upon the implementation, it is possible that the archival tagging module 174 and the archiving retrieval module 178 will have user-based permissions and individualized (user-based) indices into archives that will allow one or more parties to tag a specific archive according to unique and individualized data tags. In other words, the archived media will have two different sets of data tags corresponding to the different subscribers. Either subscriber may later retrieve that archive based on the data tags specified in the meta-data fields, either based on individualized or shared (enterprise) tags.

As will be appreciated, there may be multiple media archival servers in the enterprise to handle media processing and storage. The archival database 138 preferably has terabytes of storage capacity. The various databases 130, 132, 134, 136, 138, and 140 may have their data configured according to a relational database architecture, an object oriented database architecture, or configured for access by another type of database architecture. Additionally, the data repository or storage may be simply a collection of one or more data files, wherein the data therein may be ordered or unordered.

Operational Description of the Architecture

The operation of the architecture will now be described. The first operation to be described will be the process of archiving media.

Figure 7:
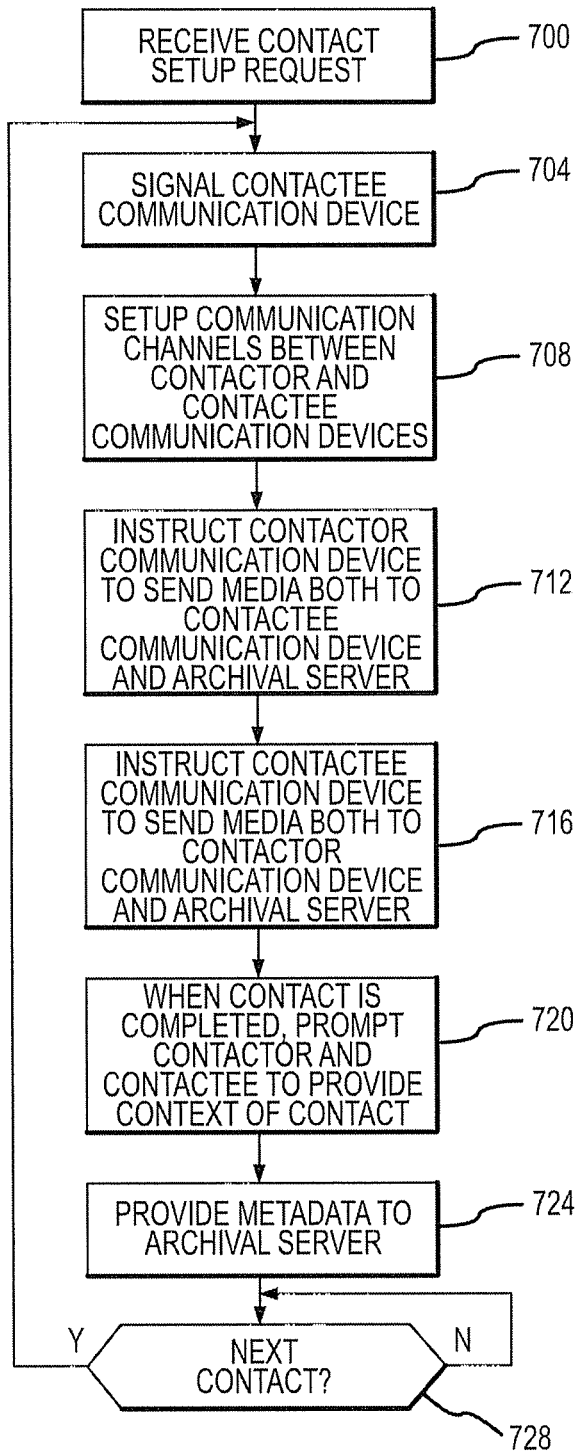
FIG. 7 is a flow chart depicting the operation of the communication controller according to an embodiment of the present invention.

FIG. 7 depicts the process for setting up a real time communication session, such as a voice call, between two entities. As will be discussed below, when a session is made from a subscriber in the enterprise the communication controller 162 instructs the parties to the session to send their respective media streams not only to the other party but also to the archival server 128.

In step 700, the communication controller 162 receives a contact setup request from a communication device 120, 148, or 150 of a subscriber.

In step 704, the controller 162 signals an internal or external contactee (or called) communication device to setup the contact.

In step 708, the communication channels between the contactor and contactee communication devices are set up. As will be appreciated, the channels, from the perspective of each communication device, include an outgoing media stream channel and an incoming media stream channel.

In step 712, the controller 162 instructs the contactor communication device to send its outgoing media stream both to the contactee communication device and to the archival server 128.

In step 716, the controller 162 instructs the contactee communication device to send its outgoing media stream both to the contactor communication device and to the archival server 128.

While the contact is in progress, each of the communication devices forwards its outgoing media streams to the archival server 128 for archiving.

In optional step 720, when the contact is completed the user agent 160 of each communication device involved in the contact prompts the contactor and contactee, as appropriate, to provide meta-data respecting the contact. The prompt may be, for example, by voice, Web pop up, or display on the communication device (such as by the user agent 160). An intelligent agent, such as the user agent 160, can act on behalf of the contactor or contactee using prior answers to similar contacts to create pertinent meta-data. The meta-data can include the context and/or subject matter of the contact. As noted above, the meta-data can be collected without user input from various system components and by parsing the keyword searching the digitized text of the media stream(s).

In step 724, the metadata is provided to the archival server 128 for tagging and archiving of the media streams.

In decision diamond 728, the controller determines whether a further contact setup request has been received. If so, the controller returns to and repeats the process beginning with step 704. If not, the controller waits for receipt of a further contact setup request.

Figure 3:
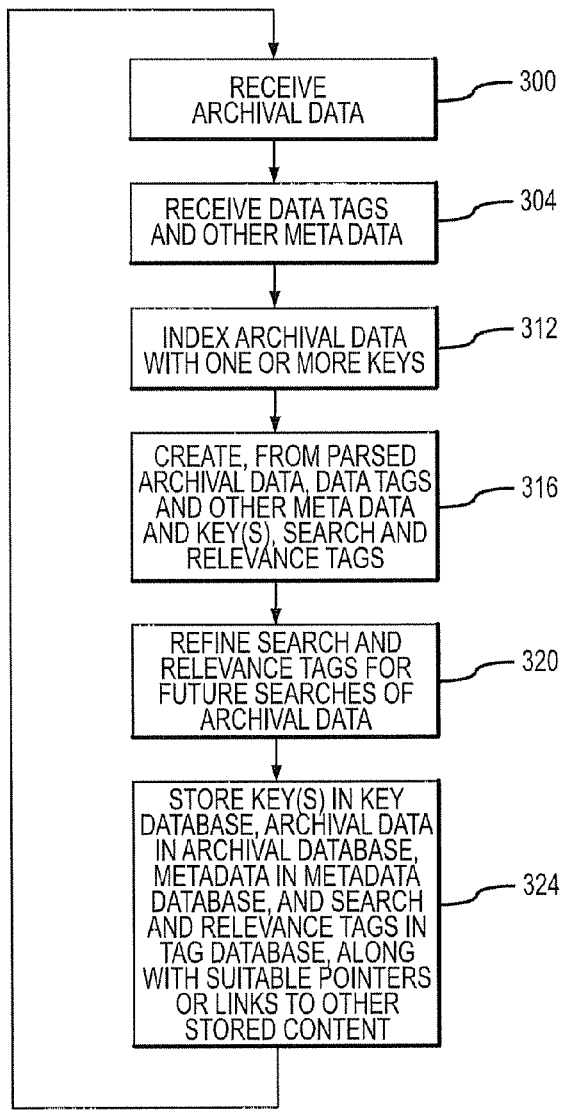
FIG. 3 is a flow chart depicting the operation of an archival server according to an embodiment of the present invention.

The archiving and tagging process will now be described with reference to FIG. 3.

In step 300, the media stream(s) or other activity information to be archived is received by the archival server 128.

In step 304, the meta-data is received from the user agent 160 of the communication device of a party associated with the activity information.

In step 312, the information is encrypted and indexed with one or more keys.

In step 316, the server 128 creates, from parsed activity information and other meta-data and keys, search and relevance tags for the content. This step normally requires parsing of the activity information and identifying in the parsed information of keywords or sets of keywords. The keywords are generally related to or derived from data tags, search and relevance tags, keys, and other meta-data. As noted, the keywords may be enterprise or user selected or generated automatically by artificial intelligence, such as a neural network.

In one configuration, the subscriber, after successful authentication by the user authentication agent 172, receives from the archival tagging module 174 appropriate indices, tags, and other meta-data and updates the received meta-data for use by the archival tagging module 174 in analyzing and describing the activity information.

In step 320, the search and relevance tags are further refined for future searches of the archived information. This is done based on user input, rules defining the search mechanism to be employed (which may vary based on the type of archived information), policy set by the system administrator, and by previous queries for requests on topics.

In step 324, the keys are stored in the key database 130, the archival data or activity information in the archival database 138, the meta-data in the meta-data database 136, and the search and relevance tags in the tag database 134 along with suitable pointers or links to other related stored content. In storing the various types of data, tags and keys are normally disconnected from the archival data for security reasons. Stated another way, there are no links in the archived data back to the meta-data and keys. There are, however, links or pointers from the meta-data and keys to the corresponding archived data. Additionally, the archival data is preferably stored in a database/server pair different from the database/server pair used to store the corresponding meta-data.

Figure 2:
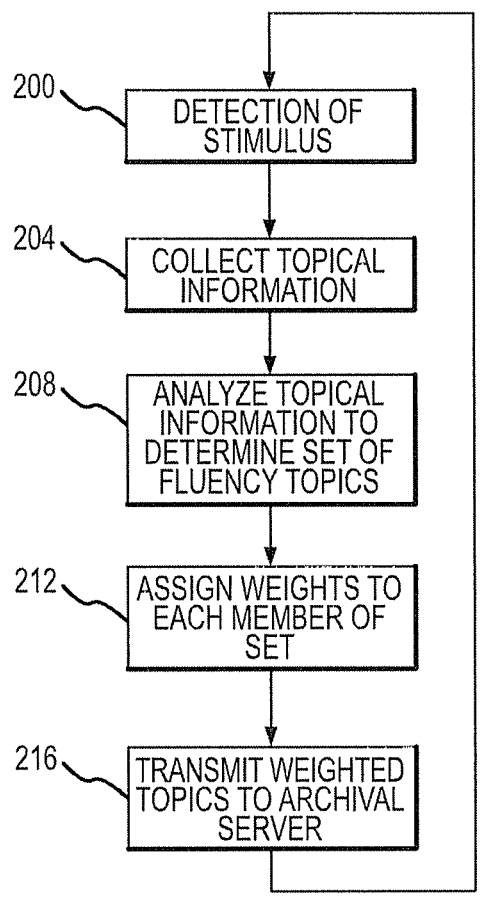
FIG. 2 is a flow chart depicting the operation of a user agent according to an embodiment of the present invention.

FIG. 2 describes the operation of the user agent 160 in collecting and analyzing topical information for determination of fluency.

In step 200, the user agent 160 detects a stimulus that triggers the analysis of fluency. The stimulus may be powering up the communication device, key or button activation, receipt of a voice command, initiation of a voice call, the sending of a text response to an instant message or email, opening of an application (e.g., a word processing application or spreadsheet application), creation or modification of a document, creation of an email, initiation of an Instant Messaging session, and establishment of a media stream (voice, video, text, web, etc.).

In step 204, the user agent 160, in response, collects topical information. What information is topical information depends on the application and/or type of stimulus detected. Topical information may include activity information and meta-data associated therewith. It may only be the meta-data itself.

In step 208, the user agent 160 analyzes the topical information to determine a set of fluency topics. This is typically done by identifying instances of keywords or sets of keywords in the topical information. The keywords or sets of keywords normally map to a corresponding set of fluency topics that are selected by the enterprise or learned by the system based on previous topical queries.

In step 212, the user agent 160 assigns weights to each of the identified keywords or sets of keywords identified in the topical information. It then maps the keywords or sets of keywords to a corresponding fluency topic. The value or level of fluency in the associated topic is then adjusted by the weighted values assigned to the identified keywords or sets of keywords corresponding to the topic. In one variation, the various keywords or sets of keywords identified over time that contribute to the fluency level are re-weighted in light of age and the entire fluency level recalculated in light of the ages of the various identified keywords or sets of keywords.

In step 216, the user agent 160 transmits the weighted fluency topics to the archival server 128.

In one variation, the user agent 160 simply collects the topical information and forwards the information to the archival server 128. The topical user agent 168 identifies the keywords or sets of keywords in the collected topical information and determines fluency levels.

The retrieval of fluency lists, archived information, and meta-data will now be described.

Figure 4:
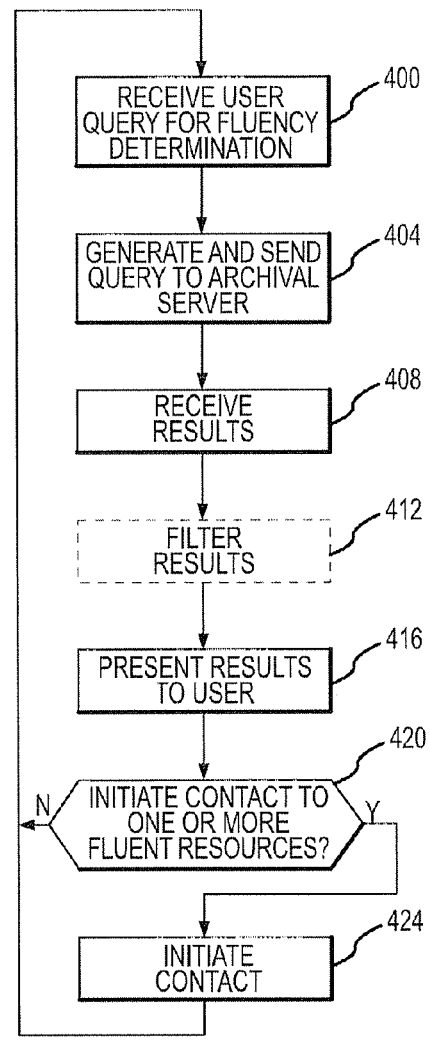
FIG. 4 is a flow chart depicting the operation of the user agent according to an embodiment of the present invention.

FIG. 4 depicts the process used to receive a fluency listing.

In step 400, the user agent 160 receives a query for a fluency determination. The query normally includes one or more topics and asks for persons fluent in the selected topic(s).

In step 404, the user agent 160 generates a fluency request and sends the request to the archival server 128.

In response, the topical user agent 168 accesses the subscriber database 140 and retrieves the list of subscribers having at least a threshold level of fluency in the topic. In one variation, the topical user agent 168 requests the archival retrieval module to search another database, such as the meta-data database 136, tag database 134, and/or archival database 138 for occurrences of the topics.

There will often be situations where the topic has no relationship to frequently used fluency topics. For example, the topic could relate to an event that occurred within the last few hours. In such situations, the topical user agent 168 may get a negative response from the subscriber database 140 as the fluency level in the listed topic has not yet been computed for any subscriber. In that event, the agent 168 will further query other relevant sources for possible hits. When the results are returned, the agent 168 may need to determine a fluency level for the topic as that level may not have been determined previously by any user agent 160. The determined fluency level is sent to the subscriber database 140 to be stored under the appropriate person's profile and returned to the requesting user agent 160 for presentation to the subscriber. For this reason it is advantageous for the user agent 160 or the topical user agent 168 to temporarily create topical entries (for later tagging) for topics heretofore not already encountered. These temporary topical entries make possible the ability to get information on topics that became relevant only very recently (before any enterprise tags could be created). Should a query on the topic be made, or the administrator of the system so indicate, that topic could then be associated for enterprise tags with initial entries already created via the temporary topical entries.

In step 412, the user agent 160 receives the results and optionally filters the results based on subscriber preferences. For example, the subscriber may expressly request that certain individuals always be removed from the list or that only persons having a higher threshold fluency level be presented.

User Agent 160, will use the information returned from the query to request presence information on the individuals returned from presence server 122. In an alternative (and preferred) embodiment, topical user agent 168 will collect the presence information from presence server 122, and include it in the results returned to user agent 160.

In step 416, the results are presented to the subscriber using a graphical display similar to FIG. 5 or using an audible interface with speech recognition that supplies the information of FIG. 5.

In decision diamond 420, the user agent 160 determines whether a contact is to be initiated to one or more of the listed fluent resources. If so, the contact is initiated in step 424. If not or after step 424, the user agent 160 returns to step 400 and awaits the next user query. It is important to note that when the individuals are contacted for the requested query, they will be presented with the reason for the request (topic), the person initiating the session (name, number, ID, etc.), the indicated priority of the request, and whether the session is part of a multiparty conference request. Optionally, when a communication session is accepted, additional information about the session could be delivered by the originator of the request within the session (such as a file to be shared or discussed) or applet or servlet for providing programmatic access to an application, or other supplementary data or operation for shared use. It is also important to note that the recipient could have previous indicated programmatic rules for disposition of such requested sessions based on any of the information presented to the user when such a session is requested (such as originator, priority, topic). In the absence of pre-indicted programmatic disposition of such requests, the recipient may be prompted about disposition before accepting or denying the session including the ability to set configuration for disposition of future requests.

Figure 6:
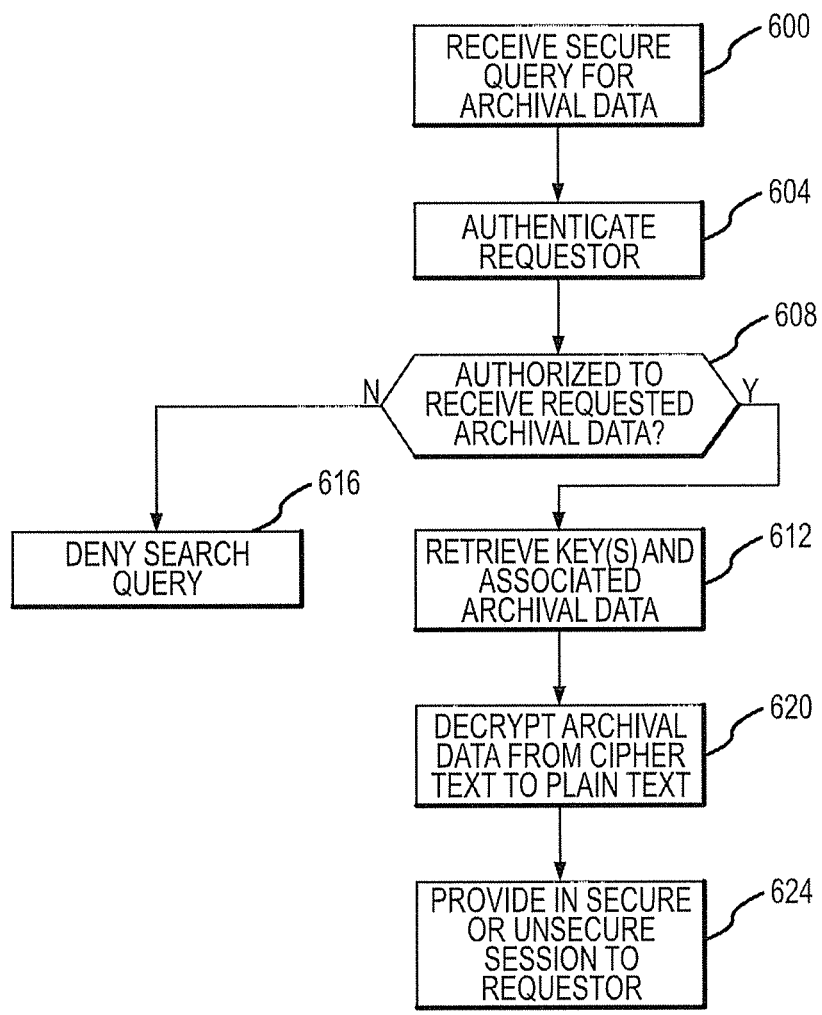
FIG. 6 is a flow chart depicting the operation of the archival server according to an embodiment of the present invention.

Finally, the process for accessing stored content is described with reference to FIG. 6.

Prior to discussing the process, it is important to understand the search mechanism. The archival search system can use any system for electronically searching large volumes of content. For example, the search system can use any of the techniques used by Web searching engines, such as Google™, Yahoo™, Overture™, Inktomi™, LookSmart™, FindWhat™, AskJeeves.com™, AltaVista™, and the like. As will be appreciated, the search system can use spiders and web crawling techniques to build lists of words found in the archival database.

To make for more useful results, the archival retrieval module or search engine preferably stores more than just the tag and pointer to the corresponding content. The retrieval module 178 can store the number of times that the tag appears in the corresponding content. In these techniques, not only the tags used but also where the tags are found and the timestamp of the content associated with the tags can be considered. The engine can assign a weight to each entry, with increasing values assigned to tags as they appear near the top of the document, in sub-headings, in links, in the meta tags, or in the title of the document and as they appear in more recent content as opposed to older content. Unlike conventional Internet search engines, the retrieval module 178 weighs more recent content more heavily than less recent content or uses a time-based or temporal weighting system. Regardless of the precise combination of additional pieces of information stored by the search engine, the stored search content is preferably encoded to save storage space.

After the information is compacted, it is ready for indexing. An index has a single purpose: It allows information to be found as quickly as possible. There are quite a few ways for an index to be built, but one of the most effective ways is to build a hash table. In hashing, a formula is applied to attach a numerical value to each word. The formula is designed to evenly distribute the entries across a predetermined number of divisions. This numerical distribution is different from the distribution of words across the alphabet, and that is the key to a hash table's effectiveness. The hash table contains the hashed number along with a pointer to the actual data, which can be sorted in whichever way allows it to be stored most efficiently. The combination of efficient indexing and effective storage makes it possible to get results quickly, even when the user creates a complicated search. Searching through an index involves a user building a query and submitting it through the search engine. The query can be quite simple, a single word at minimum. Building a more complex query is possible with the use of Boolean operators that allow one to refine and extend the terms of the search. Exemplary Boolean operators include "and", "or", "followed by", "not", "near", and quotation marks. In the absence of an operator, the search engine assumes that the list of words embodies related topics (inferring a relationship order) with the first and last words having the greatest initial weight.

When the content is presented to the requester, it is weighted based on upon the weighting values assigned or otherwise associated with each located item. Generally, more recently timestamped items will be presented before less recently timestamped items and content having more occurrences of the requested query weighing more heavily than less occurrences. It should be noted that when the query is based on finding an individual fluent in a topic, that the occurrences relates to the number of occurrences an individual has communicated about the topic in one dimension, the number of people that the individual has communicated on the topic with in another dimension, the recency of communication of the topic in yet another dimension, whether the individual has written a document on the subject (or containing the subject) in another dimension, and the weight of n-th order topics related to the original topic(s) associated with the individual in question. A metric providing a result to be returned on the individual is determined using a weight derived from all the dimensions described. This metric could be determined by the enterprise, or customized by the user making a query.

With this in mind, the archival retrieval module 178 receives a secure search query in step 600. Depending on the requested content, the requester may need to be authenticated. The content can be not only archived data but also tags and other meta-data.

When authentication is required, the user authentication agent 172, in step 604, authenticates the requestor using techniques known to those of ordinary skill in the art.

In decision diamond 608, the retrieval module 178 determines whether the requestor has been successfully authenticated and/or, even if successfully authenticated, is authorized to receive the requested content. When the requester is not successfully authenticated or when he or she is not authorized to receive the requested content, the retrieval module 178, in step 616, denies the search query. When the requestor is successfully authenticated and when he or she is authorized to receive the requested content, the retrieval module 178, in step 612, the retrieval module 178 performs the search, retrieves the key(s), if any, for the located content, and the located content itself.

Identifiers of the located content are provided to the requestor. He or she can select which of the content is to be provided.

In step 620, the located content and user-requested is decrypted from ciphertext to plaintext.

In step 624, the decrypted content is provided to the requestor in a secure or unsecure session.

In one configuration, the requestor first accesses the tags, e.g., his or her tag cloud, and selects Boolean search terms based on the tags and other meta-data values. The requestor then searches for the actual archived content. The content is made available and/or provided to the requestor using a variety of methods, including streaming media presented to the user via a browser-based interface (e.g., embedded Windows media files in Web pages), made available for downloading in native formats (e.g., Podcasting or downloading of files to MP3 players), and made accessible via other media-capable platforms (e.g., in a manner similar to retrieval of voice mails and playback to users via phones).

A number of variations and modifications of the invention can be used. It would be possible to provide for some features of the invention without providing others.

For example in one alternative embodiment, the determination of fluency levels is performed by the archival server 128 rather than the user agent 160. In this configuration, the search and relevance tags, rather than data tags, are used to identify, for given tracked activities, occurrences of topic keywords (which are synonymous with the tags) and the topic keywords weighted by the server 128 for updating of the fluency level of the subscriber for the corresponding topic.

In another alternative embodiment, the communication controller, rather than instructing each of the communication devices to a communication session to send their respective outgoing media streams to the archival server 128, replicates the media streams and sends them to the server 128.

In yet another embodiment, an aggregation entity, such as aggregation entity 166, aggregates the media streams and sends them to the server 128. This is done instead of the communication controller instructing each of the communication devices to a communication session to send their respective outgoing media streams to the archival server 128.

In yet another embodiment, the fluency level is synonymous with skill level in a contact center. Stated another way, the present invention can provide a methodology to provide real time updating of agent skill levels based upon the agent's daily activities and customer interactions.

In yet another embodiment, dedicated hardware implementations including, but not limited to, Application Specific Integrated Circuits or ASICs, programmable logic arrays, and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be stated that the software implementations of the present invention are optionally stored on a tangible storage medium, such as a magnetic medium like a disk or tape, a magneto-optical or optical medium like a disk, or a solid state medium like a memory card or other package that houses one or more read-only (non-volatile) memories. A digital file attachment to e-mail or other self-contained information archive or set of archives is considered a distribution medium equivalent to a tangible storage medium. Accordingly, the invention is considered to include a tangible storage medium or distribution medium and prior art-recognized equivalents and successor media, in which the software implementations of the present invention are stored.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for identifying selected resources or content, comprising:

a processor analyzing a selected communication by a selected communicant for selected content;

when the selected content is present in the selected communication, the processor determining a weighted value associated with at least one of the selected communication and communicant, wherein the weighted value reflects at least two of timing information associated with the selected communication, a context of the selected communication, a type of selected communication, a level of order relationship associated with the selected content, a requester preference, and a weight associated with the selected communicant of topics determined to have an n-th order relationship with the selected content;

the processor subsequently identifying the selected communicant as being fluent in the selected content based on the weighted value;

the processor ordering a plurality of communicants in a list of two or more communicants that are identified as being fluent in the selected content, wherein the ordering is based on relative weighted values to the two or more communicants;

providing the list to a requester based on a request for information associated with the selected content, wherein a requester can elect to contact automatically the listed communicants in a contact sequence, wherein the contact sequence is specified by the requester; and identifying the plurality of communicants as being fluent in the selected content based on respective weighted values, and wherein the requester can elect to contact two or more selected ones of the plurality of identified communicants to initiate a conference call to the two or more selected ones of plurality of identified communicants.

2. The method of claim 1, further comprising locating the selected communication, wherein the selected content is a tag, wherein the weighted value is associated with a timestamp associated with the selected communication, and wherein the weighted value further reflects at least one of a number of times the selected content is used in the selected communication and a context of use of the selected content in the selected communication.

3. The method of claim 2, wherein the requester requests a number of selected communications related to the selected content and further comprising:
previously storing a representation of the communication;
tagging the representation of the stored communication, the tags being descriptive of a plurality of an identity of the selected communicant, a content of the selected communication, a time associated with the selected communication, a form of the representation, and context of the selected communication; and
providing the representation to the requester.

4. The method of claim 3, wherein the tags, when stored, are disconnected from the stored representation and wherein the representation is stored in ciphertext using a key associated with a stored location of the representation.

5. The method of claim 1, further comprising:
receiving a request from the requester for a number of individuals fluent in the selected content;
identifying the selected communicant as being fluent, wherein the selected content corresponds to a topic, wherein the weighted value is used to determine a fluency level in the topic, and wherein the weighted value is associated with a timestamp associated with the selected communication.

6. The method of claim 1, wherein the list comprises an option to contact each of the listed persons and ordering the listed persons based upon the relative levels of fluency of the persons.

7. The method of claim 6, wherein the list further includes presence information associated with each of the listed persons.

8. The method of claim 7, wherein a level of urgency is used to determine a selected person who will receive the contact.

9. The method of claim 6, wherein the requester specifies a level of urgency and further comprising:
in response to a selection by the requester of a listed person, contacting the selected person; and
providing, without involvement by the requester, to the selected person an identity of the requester, a reason for the contact, and the level of urgency of the contact.

10. The method of claim 1, further comprising:
forwarding the selected communication, during an associated communication session with another selected communicant, to an archival server for storage.

11. A non-transitory computer readable medium comprising processor executable instructions to perform the steps of claim 1.

12. The method of claim 1, wherein the weight is further based on a frequency of occurrence of the selected content, a broadness of the selected content based on a number of parties communicated with, whether the selected content was originated by the communicant, a communicant's preference, whether the communicant authored a document containing the topic, and timing information associated with the corresponding communication.

13. The method of claim 1, wherein the at least two of the weighted values comprise a level of order relationship associated with the selected content and a weight associated with the communicant of topics determined to have an n-th order relationship with the selected content.

14. An enterprise system, comprising:
an enterprise network including a plurality of communication devices associated with a plurality of subscribers, wherein the subscribers are part of the enterprise;
an enterprise server operable to store representations of communications between subscribers or between subscribers and nonsubscribers;
a module executed by the enterprise server, the module operable to:
analyze a plurality of communications, both in-coming to and out-going from the enterprise, for selected content;
analyze the selected content; and
when the selected content is analyzed, determine a weighted value associated with at least one of the corresponding communication and subscriber of the corresponding communication, wherein the weighted value reflects one or more of a context of the corresponding communication, a type of corresponding communication, a level of order relationship associated with the selected content, a requester preference, and a weight associated with a communicant of the topic determined to have an n-th order relationship with the selected content;
wherein the archival server subsequently locates at least a portion of the corresponding communication based on the weighted value or identifies the subscriber of the corresponding communication as being fluent in the selected content based on a weighted value, wherein the archival server identifies a plurality of subscribers as being fluent in the selected content based on the weighted value, and wherein the requester can elect to contact two or more selected ones of the plurality of identified subscribers to initiate a conference call to the two or more selected ones of plurality of identified subscribers.

15. The network of claim 14, wherein the at least a portion of the corresponding communication is located, wherein the selected content is a tag, wherein the weighted value is associated with a timestamp associated with the corresponding communication, and wherein the weighted value further reflects at least one of a number of times the selected content is used in the corresponding communication and a context of use of the selected content in the corresponding communication.

16. The network of claim 14, wherein the requester requests a number of subscribers fluent in the selected content, wherein the subscriber is identified as being fluent, wherein the selected content corresponds to the topic, wherein the weighted value is used to determine a fluency level in a the topic, and wherein the weighted value is associated with a timestamp associated with the communication.

17. The network of claim 14, wherein the module is further operable to provide to the requester a list of persons fluent in the topic, the list including the subscriber and comprising an option to contact each of the listed subscribers and ordering the listed subscribers based upon the relative levels of fluency of the subscribers.

18. The network of claim 14, wherein the network is an enterprise network and wherein the list further includes presence information associated with each of the listed subscribers.

19. The network of claim 14, wherein the requester specifies a level of urgency and wherein the module is further operable to, in response to a selection by the requester of a listed subscriber, contact the selected subscriber; and provide, without involvement by the requester, to the selected subscriber an identity of the requester, a reason for the contact, and the level of urgency of the contact.

20. The network of claim 14, wherein the requester requests a number of communications related to the selected content, wherein the archival server is operable store a representation of the corresponding communication, while the corresponding communication is occurring; tag the representation of the corresponding communication, the tags being descriptive of a plurality of an identity of the subscriber, a content of the corresponding communication, a time associated with the corresponding communication, a form of the representation, and context of the corresponding communication; and provide the representation to the requester.

21. The network of claim 20, wherein the tags, when stored, are disconnected from the stored representation and wherein the representation is stored in ciphertext using a key associated with a stored location of the representation.

22. The network of claim 14, wherein the weight is further based on a frequency of occurrence of the selected content, a broadness of the selected content based on a number of parties communicated with, whether the selected content was originated by the communicant, a communicant's preference, whether the communicant authored a document containing the topic, and timing information associated with the corresponding communication.

23. The network of claim 14, wherein the requester can elect to contact automatically the plurality of identified subscribers in a contact sequence, wherein the contact sequence is specified by the requester.

24. The network of claim 23, wherein a first subscriber in the contact sequence is contacted, wherein the contact sequence is stopped in response to the first subscriber in the contact sequence answering the contact, and wherein the contact sequence continues in response to the first subscriber in the contact sequence not answering the contact.

25. The network of claim 14, wherein the conference call is terminated of less than the two or more selected ones of the plurality of identified subscribers answer the conference call.

* * * * *